July 8, 1924.
C. F. SCOTT
SYSTEM OF MOTOR CONTROL
Filed Feb. 20, 1923
1,500,851
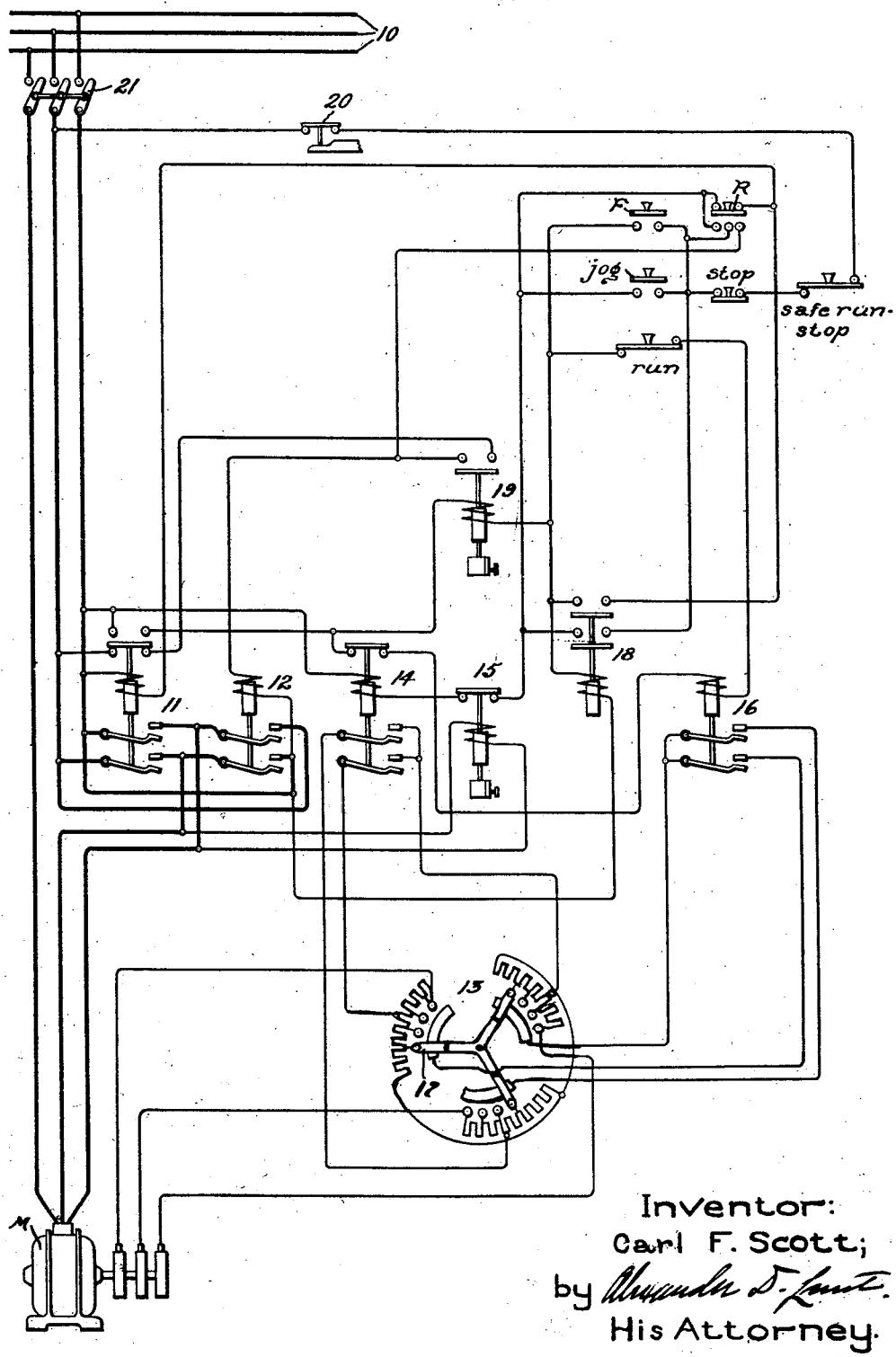
Inventor:
Carl F. Scott;
by
His Attorney.

Patented July 8, 1924.

1,500,851

UNITED STATES PATENT OFFICE.

CARL F. SCOTT, OF YONKERS, NEW YORK, ASSIGNOR TO GENERAL ELECTRIC COMPANY, A CORPORATION OF NEW YORK.

SYSTEM OF MOTOR CONTROL.

Application filed February 20, 1923. Serial No. 620,268.

*To all whom it may concern:*

Be it known that I, CARL F. SCOTT, a citizen of the United States, residing at Yonkers, in the county of Westchester, State of New York, have invented certain new and useful Improvements in Systems of Motor Control, of which the following is a specification.

One of the objects of my invention is to provide an improved arrangement for starting and stopping and generally controlling an electric motor.

More specifically, one of the objects of my invention is to provide an improved arrangement whereby an electric motor is started, accelerated, reversed and stopped under the control of master switch mechanism.

A further object of the invention is to provide an improved arrangement whereby the motor is stopped by reversing the connection of the motor to the source of supply, the arrangement being preferably such that the motor is automatically deenergized when the braking action has substantially ceased.

Another object of the invention is to control a rheostat provided for governing the acceleration of the motor in such a manner that with the rheostat connected in the motor circuit for braking, a proper braking value is obtained.

Another object of the invention is to provide an arrangement whereby the motor may be started in the reverse direction by means including the same master switch which effects the disconnection of the motor from the source of supply for the forward direction of operation and the reverse connection of the motor to the source of supply for braking, the arrangement preferably being such that the rheostat in the motor circuit is simultaneously controlled in such a manner that the braking effect of the motor is properly regulated and the motor will not start in the reverse direction when the motor is stopped in this manner.

Another object of the invention is to provide an arrangement whereby when the motor is stopped by reversing the connection of the motor to the source of supply, the automatic devices for controlling the motor are reset so that the motor may be subsequently operated in either the forward or reverse direction as desired.

Although my invention is particularly applicable to the control of alternating current motors, in certain of its aspects the invention is not limited to its use with alternating current motors, but is applicable to other types of motors as well.

These and other objects of the invention, as will be either fully explained hereinafter or as will be apparent to those skilled in the art, are attained in the system of control for an alternating current motor which is shown in the simplified motor control diagram on the accompanying drawing.

Referring to the drawing, the electric motor M, which is shown as of the alternating current type having slip rings, is arranged to be connected to the three-phase source of supply 10 for forward or reverse operation by a suitable electroresponsive switch mechanism, comprising the forward line contactor 11 and the reversing line contactor 12. The rheostat 13 is connected in the secondary circuit of the motor, that is, to the slip rings of the motor, and this rheostat has a resistance of such a value that if all of the rheostat is included in the motor circuit, the motor will not start in either direction under load. The motor is controlled by means of master switch mechanism comprising the forward push button F, the reversing push button R, the jog button, stop, safe run—stop, and the run push buttons which are designated as such on the drawing. The electromagnetic switch or contactor 14 is provided for short circuiting a portion of the resistance of the rheostat 13 so as to obtain a high motor torque at starting. The time element relay 15 is provided for deenergizing the high torque contactor 14 an interval after the motor has started, and the normal running contactor 16 is connected to be under the control of the high torque contactor 14 so that the contactor 16 cannot close until the contactor 14 has opened. This contactor 16 is provided for establishing a Y point of the resistors of the rheostat 13 so as to include in the motor secondary the portion of the resistance which has been predetermined by the setting of the adjustable dial 17. The arrangement is such that after the motor has started under the control of the high torque contactor 14, this high torque contactor is automatically deenergized and the contactor 16 will close so as to thereby predetermine the normal operating speed of the motor as determined by the setting of the rheostat 13. The jog relay 18 is provided for maintaining the energization of the forward line contactor 11 after the forward push button has been depressed, and for other purposes, as will appear hereinafter. The time element relay 19 is provided for automatically deenergizing the reverse contactor 12 when the connection of the motor to the source of supply is reversed and the motor operates to give a braking effect.

The adjustment of this relay is such that when the motor is braked by having the connections to the source of supply reversed and the braking effect has substantially ceased, the reversing contractor will be opened so as to thereby disconnect the motor from the source of supply. The master switch 20 is provided for automatically controlling the motor from a point independent of the operator, as for example, in case the system is used as a printing press drive, when the automatic feeder of the press clogs. The master switch 20 may in this case be a "feeder trip" switch which will automatically open when the automatic feeder of the press becomes clogged. Obviously the automatic switch 20 may be automatically operated in response to any predetermined condition such that would require automatic stopping of the press or other machine driven by the motor. The connections are such that when this switch is automatically opened, the forward line contactor is not only opened but the reversing contactor is automatically closed, and substantially all of the resistance of the rheostat 13 is included in the motor circuit, so that the motor will be caused to automatically operate as a brake and bring the device driven by the motor to rest. As soon as the device driven by the motor has been brought to rest, the inverse time element relay 19 will operate to disconnect the motor from the source of supply.

As thus constructed and arranged, and with the parts in their respective positions shown in the drawings, the operation of my invention is as follows: The disconnecting switch 21 will first be closed. Assume that it is desired that the motor drive the driven machine in the forward direction. The forward (F) push button will be closed, thereby energizing the jog relay 18 to close through a circuit which may be traced from the middle supply conductor through the master switch 20, safe run—stop push button, stop push button, forward push button, the coil of the jog relay, to the right hand conductor of the three-phase source of supply. The closing of the jog relay 18 will complete a circuit for the winding of the forward line contactor 11 and the circuit for the winding of the high torque contactor 14, so that these contactors will close practically simultaneously with the closing of the forward push button. The circuit for the forward line contactor 11 may be traced through the safe run—stop push button, stop push button, the lower contacts of the jog relay 18, through the contacts of the reverse push button R, through the winding of the contactor 11, to the right hand supply conductor. The circuit for the winding of the high torque contactor 14 may be traced through the safe run—stop push button, stop push button, lower contacts of the jog relay 18, contacts of the time element relay 15, through the winding of the high torque contactor 14, to the right hand supply conductor.

The jog relay 18 will be maintained closed even though the forward push button be released through a circuit which includes the safe run—stop push button, stop push button, lower contacts of the jog relay 18, reversing push button R, upper contacts of the jog relay, through the winding of this relay to the right hand supply conductor. The forward push button may thus be released and the equipment will continue to operate.

It will be noticed that the winding of the time element relay 15 is energized when either the forward or reverse line switches is closed, so that this relay will, after an interval determined by the setting of the dash pot which is indicated conventionally, open its contacts and thereby deenergize the high torque contactor 14. The object of this arrangement is that since the resistance of the rheostat 13 is so high that the motor would not start with all of the resistance in the circuit, by short circuiting a portion of this resistance through the operation of the high torque contactor, the motor is nevertheless permitted to start. However, it may be undesirable for normal operation to run the motor at the speed which would be determined by the high torque contactor, and accordingly I have arranged the system in such a way that the high torque contactor 14 is automatically deenergized by the time element relay 15 after the connection of the motor to the source of supply. This interval of time will be adjusted to be of such a duration that the motor and the load driven thereby are permitted to get "under way" properly, and then the high torque contactor is deenergized.

It will be observed that the rheostat 13 is variable, and that the arrangement is such that this rheostat may be set to predetermine the normal running speed of the motor. Co-operating with the dial 17 of the rheostat is the normal speed contactor 16 which is energized to close when the high torque contactor 14 is automatically opened. The closing of the contactor 16 has the effect of automatically inserting in the motor circuit the amount of the resistance of the rheostat 13 which has been predetermined by the setting of the dial 17. By this arrangement the motor is accelerated from rest to a predetermined normal operating speed in a well regulated manner. It will also be observed that the dial 17 of the rheostat may be varied while the motor is running, so as to vary at will the normal operating speed of the motor.

It will be observed that the inverse time element relay 19 is energized to immediately close its contacts upon the closing of the forward line contactor 11, the circuit for the winding of this relay being through the safe run—stop button, the stop button, lower contacts of the jog relay 18, reverse push button R, upper contacts of the jog relay 18, through the coil of the relay 19, upper contacts of the auxiliary switch mechanism of the forward line contactor 11, to the right hand conductor of the source of supply. This relay will close substantially simultaneously with the closing of the jog relay 18 and the forward line contactor 11, but the relay is so arranged that when the relay winding is deenergized, it will not open its controlled contacts until after an interval of time. This is made use of to control the stopping of the equipment in case it is desired to stop the motor and the load driven thereby.

The reverse push button R will be depressed to stop the equipment thereby deenergizing the jog relay 18 and effecting the opening of the forward line contactor 11, the normal running speed contactor 16, and the energization of the reverse contactor 12. The circuit for the winding of the reverse contactor 12 is through the middle lower contact of the reverse push button, right hand lower contact of this button, through the winding of the contactor, to the right hand supply conductor. It will be observed that because of the fact that the time element relay 15 is maintained energized and its controlled contacts maintained open, the high torque contactor 14 cannot close, and the contactor 16 cannot close because of the fact that the winding of this contactor has been broken through the opening of the jog relay 18. All of the resistance of the rheostat 13 is inserted in the motor secondary, so that the motor will now operate as a braking generator to bring the load to rest. It will not be necessary for the operator to maintain the reverse push button depressed, since if the operator releases the same, the reverse contactor will be maintained energized for an interval through a circuit including the lower auxiliary switch contacts of the forward contactor 11 and the contacts of the inverse time element relay 19. The time element relay 19 is adjusted so that when the load has been brought substantially to rest by being braked in the manner set forth, this relay will automatically open and thereby deenergize the reverse contactor 12 and disconnect the motor from the supply circuit. If while the equipment is operating in the forward direction, the automatically operated master switch 20 is opened in response to any predetermined condition which would make desirable the stopping of the press, the line contactor 11 is automatically opened and the reversing contactor 12 automatically closed through the lower contacts of the auxiliary switch associated with the forward contactor and the contacts of the inverse time element relay 19.

In case it is desired to jog the equipment in the forward direction, the jog push button will be closed, thereby energizing the forward line contactor through a circuit which includes the safe run—stop, stop, jog and reverse push buttons. The high torque contactor 14 will be energized to close for an interval determined by the setting of the time element relay 15, and this will permit the press or other machine driven by the electric motor to start and get under way. After an interval the relay 15 will automatically open and thereby deenergize the contactor 14 so that the motor will operate in the forward direction with all of the resistance included in the motor secondary. The contactor 16 cannot be closed because of the fact that closing the jog push button will not energize the jog relay 18 to close.

It will also be observed that the motor may be operated in the reverse direction by depressing the reverse push button R. Assume that the motor is at rest, if the reverse push button is depressed, the reverse contactor 12 will close and the high torque contactor 14 will also be energized to close through the lower contacts of the reverse push button, so that the motor may start the load in the reverse direction and get under way. After an interval, the time element relay 15 will automatically open in the manner previously explained, thereby deenergizing the high torque contactor 14 and inserting all of the resistance of the rheostat 13 in the motor secondary. This will cause the motor to normally run in the reverse direction at a comparatively slow speed, for the reason that frequently it is not desired that the driven machine be operated at full speed in the reverse direction. The contactor 16 will not be energized to close for the reason that the jog relay 18 is not energized to close. The reverse push button thus serves the double purpose of operating as a reversing button when the motor is at rest and it is desired to operate the motor in the reverse direction, and the purpose of a braking control push button when the motor is running in the forward direction and it is desired to stop the machine driven by the motor.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. The combination with an electric motor, of electroresponsive switch mechanism for connecting the motor to a source of supply for forward or reverse operation, master switch mechanism for controlling the said electroresponsive switch mechanism, connections whereby operating the said master switch mechanism causes the operation of said electroresponsive switch mechanism to disconnect the motor from the source of supply for forward direction of operation and connect the motor to the source of supply for reverse operation to produce a braking action, and a time element device set into operation responsively to the operation of said master switch mechanism for automatically disconnecting the motor from the source of supply when the braking action has substantially ceased.

2. The combination with an electric motor, of electroresponsive switch mechanism for connecting the motor to a source of supply for forward or reverse operation, a variable resistor for controlling the motor speed, master switch mechanism for controlling the said electroresponsive switch mechanism, connections whereby operating the said master switch mechanism causes the operation of said electroresponsive switch mechanism to disconnect the motor from the source of supply for forward direction of operation and connect the motor to the source of supply for reverse operation with the said resistor in the motor circuit to produce a braking action, switch mechanism under the control of the said master switch mechanism for controlling the said resistor to regulate the braking action, and means for automatically disconnecting the motor from the source of supply when the braking action has substantially ceased.

3. The combination with an electric motor, of electroresponsive line switch mechanism for connecting the motor to a source of supply for forward or reverse operation, a rheostat having a resistance such that when entirely included in the motor circuit the motor will not start under load, a contactor for temporarily short circuiting a portion of the said rheostat to produce a high motor torque at starting, master switch mechanism for controlling the said line switch mechanism, and connections whereby operating the said master switch mechanism causes the operation of said line switch mechanism to disconnect the motor from the source of supply for forward direction of operation and connect the motor to the source of supply for reverse operation with substantially all of the resistance of said rheostat included in the motor circuit to produce a braking action.

4. The combination with an alternating current motor, of forward and reverse line switches, a rheostat connected in the motor secondary and having a resistance such that when entirely included in the motor circuit the motor will not start under load, a contactor for short circuiting a portion of said rheostat to produce a high motor torque at starting, means for automatically deenergizing the said contactor an interval after the motor has started, master switch mechanism for controlling the said line switches and the said high torque contactor, connections whereby operating the said master switch mechanism causes the line switches to reverse the connection of the motor to the source of supply with substantially all of the resistance of said rheostat included in the motor circuit to produce a braking action, and means for automatically disconnecting the motor from the source of supply when the braking action has substantially ceased.

5. The combination with an electric motor, of a variable rheostat for predetermining the normal running speed of said motor, electroresponsive switch mechanism for controlling the said rheostat, and connections whereby the said switch mechanism is energized for an interval during the starting of said motor to govern the said rheostat to produce a high motor torque at starting and then operated to limit the said motor to the normal running speed determined by the setting of the said rheostat.

6. The combination with an electric motor, of a variable rheostat for predetermining the normal running speed of said motor, electroresponsive switch mechanism for controlling the said rheostat, means for automatically deenergizing the said switch mechanism after the motor has started, and connections whereby the closing of the said switch mechanism governs the said rheostat to produce a high motor torque at starting and the opening of the said switch mechanism limits the said motor to the normal running speed determined by the setting of the said rheostat.

7. The combination with an electric motor, of a variable rheostat for predetermining the normal running speed of said motor, electroresponsive switch mechanism for controlling the said rheostat to produce a high motor torque at starting, a second electroresponsive switch mechanism for controlling the said rheostat to cause the motor to run at the normal speed determined by the setting of the rheostat, and connections whereby the first of said switch mechanisms is energized to close for an interval at starting and then automatically opened and the second of said switch mechanisms is energized to close responsively to the opening of the first of said switch mechanisms.

8. The combination with an electric motor, of a rheostat for controlling the same, manually operable means for governing the said rheostat to predetermine the normal running speed of the motor, electroresponsive switch mechanism for controlling the said rheostat to produce a high motor torque at starting, a second electroresponsive switch mechanism cooperating with the said manually operable means to cause the motor to run at the normal speed determined by the said manually operable means, and connections whereby the first of said switch mechanisms is energized to close for an interval at starting and to then automatically open and the second of said switch mechanisms is energized to close responsively to the opening of the first of said switch mechanisms.

9. The combination with an electric motor, of a rheostat having a resistance such that when entirely included in the motor circuit the motor will not start under load, manually operable means for governing said rheostat to predetermine the normal running speed of the motor, a contactor for short circuiting a portion of the said rheostat to produce a high motor torque at starting, means for automatically deenergizing the said contactor an interval after the motor has started, a second contactor cooperating with the said manually operable means to cause the motor to run at the normal speed determined by the said manually operable means, and connections whereby the first contactor is energized to close for an interval at starting and the second contactor is energized to close responsively to the opening of the first of said contactors.

10. The combination with an electric motor and electroresponsive switch mechanism for connecting the motor to a source of supply for forward or reverse operation, of a rheostat for controlling the acceleration and the braking of the motor, a master switch, and means comprising connections whereby operating the master switch energizes the said switch mechanism to connect the motor to the source of supply for reverse operation and the said rheostat is controlled to cause the motor to start in the reverse direction, and operating the said master switch when the motor is operating in the forward direction energizes the said switch mechanism to reverse the connections of the motor to the source of supply and control said rheostat to cause the motor to operate as a braking generator and prevent the operation of the motor in the reverse direction.

11. The combination with an alternating current motor and forward and reverse line contactors, of a rheostat connected in the motor secondary and having a resistance such that when entirely included in the motor circuit the motor would not start under load, a contactor for short circuiting a portion of said rheostat to produce a high motor torque at starting, a master switch, and connections whereby operating the said master switch energizes the reversing line contactor and the said high torque contactor to cause the motor to start in the reverse direction, and operating the said master switch when the motor is running in the forward direction deenergizes the forward line contactor and energizes the reverse contactor to connect the motor to the source of supply with substantially all of the resistance of said rheostat included in the motor circuit to produce a braking action.

12. The combination with an alternating current motor, and forward and reverse line contactors, of a rheostat connected in the motor secondary and having a resistance such that when entirely included in the motor circuit the motor will not start under load, a contactor for short circuiting a portion of said rheostat to produce a high motor torque at starting, a master switch, connections whereby operating the said master switch energizes the reversing line contactor and the said high torque contactor to cause the motor to start in the reverse direction, and operating the said master switch when the motor is running in the forward direction deenergizes the forward line contactor and energizes the reverse contactor to connect the motor to the source of supply with substantially all of the resistance of said rheostat included in the motor circuit to produce a braking action, and a switch connected to automatically deenergize the said reversing contactor when the braking action of the motor has substantially ceased.

In witness whereof, I have hereunto set my hand this 17th day of February, 1923.

CARL F. SCOTT.